United States Patent
Yahagi

(10) Patent No.: US 7,186,387 B2
(45) Date of Patent: Mar. 6, 2007

(54) EXHAUST EMISSION CONTROL SYSTEM OF INTERNAL COMBUSTION ENGINE

(75) Inventor: Hideo Yahagi, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 620 days.

(21) Appl. No.: 09/729,943

(22) Filed: Dec. 6, 2000

(65) Prior Publication Data

US 2001/0003245 A1    Jun. 14, 2001

(30) Foreign Application Priority Data

Dec. 10, 1999    (JP)    ................................. 11-352459
Nov. 8, 2000    (JP)    ............................. 2000-341040

(51) Int. Cl.
*B01D 50/00*    (2006.01)
(52) U.S. Cl. ........................ 422/177; 422/179; 422/180
(58) Field of Classification Search ................ 422/171, 422/177, 179, 180, 211, 222
See application file for complete search history.

(56) References Cited

U.S. PATENT DOCUMENTS

| | | | | |
|---|---|---|---|---|
| 3,189,418 | A | * | 6/1965 | Wright ........................ 422/176 |
| 5,538,697 | A | * | 7/1996 | Abe et al. .................... 422/171 |
| 5,857,140 | A | * | 1/1999 | Foster ........................ 422/179 |
| 6,613,297 | B1 | * | 9/2003 | Sigling ....................... 422/180 |

FOREIGN PATENT DOCUMENTS

| | | |
|---|---|---|
| DE | 199 59 612 A1 | 6/2001 |
| JP | U SHO61-066610 | 5/1986 |
| JP | U 1-119820 | 2/1989 |
| JP | U HEI 02-105521 | 8/1990 |
| JP | A 7-232082 | 9/1995 |
| JP | A 7-232084 | 9/1995 |
| JP | A HEI 07-232082 | 9/1995 |
| JP | A 10-118500 | 5/1998 |
| JP | A HEI10-231722 | 9/1998 |

* cited by examiner

*Primary Examiner*—Glenn Caldarola
*Assistant Examiner*—Tom P. Duong
(74) *Attorney, Agent, or Firm*—Oliff & Berridge, PLC

(57) ABSTRACT

An exhaust emission control system capable of enhancing a purifying performance by increasing a catalyst temperature rising speed (warm-up speed) after starting the internal combustion engine, includes a box body formed with an exhaust gas inlet and an exhaust gas outlet, a catalyst support incorporated into the box body, and a catalyst substance supported on the catalyst support. A part of the catalyst support of the exhaust gas purifying catalyst is a low resistance area formed so that a gas flow resistance is lower than in other areas. The low resistance area is disposed in such a position that a flow velocity of the exhaust gas flowing to the catalyst support is high. A temperature rising speed in the low resistance area is increased, and a temperature rising characteristic is further enhanced with this low resistance area serving as a high density support area for supporting a larger quantity of a catalyst substance such as platinum etc than in other areas.

6 Claims, 8 Drawing Sheets

A: CASE OF BEING PROVIDED WITH NOTCHED PORTION
B: CASE OF HAVING NO NOTCHED PORTION

EXHAUST EMISSION CONTROL SYSTEM OF INTERNAL COMBUSTION ENGINE

BACKGROUND OF THE INVENTION

1. Field of the Invention

The present invention relates generally to an exhaust emission control system of an internal combustion engine, and more particularly to a catalyst structure for raising a temperature at an early stage.

2. Related Background Art

An exhaust emission control system for purifying NOx from an exhaust gas discharged from an internal combustion engine capable of performing a lean combustion involves the use of, e.g., a NOx absorbent typified by an occlusion reducing type NOx catalyst. The NOx absorbent absorbs NOx when an air-fuel ratio of an inflow exhaust gas is lean (i.e., under an over oxygen atmosphere), and releases absorbed. NOx when an oxygen concentration of the inflow exhaust gas decreases. The occlusion reducing type NOx catalyst classified as one type of this NOx absorbent absorbs NOx when the air-fuel ratio of the inflow exhaust gas is lean (i.e., under the over oxygen atmosphere), and releases absorbed NOx when the oxygen concentration of the inflow exhaust gas decreases, thus reducing it into $N_2$.

If the occlusion reducing type NOx catalyst (which might hereinafter be simply called a catalyst or a NOx catalyst) is disposed in an exhaust passageway of the internal combustion engine capable of performing the lean combustion, the catalyst absorbs NOx contained in the exhaust gas when the exhaust gas having a lean air-fuel ratio flows, and releases NOx, as $NO_2$, absorbed by the catalyst when the exhaust gas having a stoichiometric ratio (theoretical air-fuel ratio) or a rich air-fuel ratio flows. Further, this is reduced into $N_2$ by a reducing component such as HC and CO contained in the exhaust gas, thereby purging the NOx.

By the way, generally a temperature of the catalyst including that type of catalyst must be raised up to a predetermined temperature region in order to purify the exhaust gas.

Accordingly, it is desirable in terms of effectively purifying the exhaust gas that the catalyst temperature be raised as soon as possible since the start-up of the internal combustion engine. Namely, if the exhaust gas flows through the catalyst in a state of the catalyst temperature is not increased, there might be a possibility in which the unpurified exhaust gas is released intact into the atmospheric air.

Therefore, the catalyst known as a start catalyst may be provided in close proximity to an exhaust port of the internal combustion engine in order to purify the emission at the start of the internal combustion engine, whereby the temperature is increased upstream of an exhaust pipe at an early stage.

Even in the case of providing the start catalyst, however, it is invariably desirable that the catalyst temperature reaches faster the predetermined active region.

On the other hand, it is difficult in many cases in terms of designing a vehicle that the exhaust passageway extending from the internal combustion engine to the catalyst is formed rectilinearly without slightly bending the passageway. A flow of the exhaust gas might be deflected depending on a configuration of the exhaust passageway disposed upstream of the catalyst, resulting in an occurrence of such a phenomenon that a flow velocity of the exhaust gas flowing into the catalyst changes, a position in which the exhaust gas encounters the catalyst deviates, and so on.

Under this circumstance, for example, Japanese Utility Model Application Laying-Open Publication No. 1-119820 discloses a system in which a loss of pressure in each passageway through the catalyst support is reduced at the center of the catalyst support, and the flow of the exhaust gas is converged at the center, thereby uniformizing the flow velocity of the exhaust gas flowing into each passageway through the catalyst support even when a direction of velocity of the exhaust gas is toward an outer peripheral portion.

As a result of implementing a variety of examinations, the inventors of the present patent application, however, discovered that a heat spot is provided, a temperature thereof is raised intensively, and the heat evolved there is transferred to other portions, thereby attaining a much earlier rise in the temperature of the whole catalyst than by warming the whole catalyst with an uniformized flow velocity of the exhaust gas.

SUMMARY OF THE INVENTION

It is a primary object of the present invention, which was devised under such circumstances, to provide a system capable of increasing an exhaust temperature rising speed of a catalyst after starting up an internal combustion system.

To accomplish the above object, according to one aspect of the present invention, an exhaust emission control system of an internal combustion engine, comprises an internal combustion engine, and an exhaust gas purifying catalyst provided in an exhaust passageway of the internal combustion engine. The emission control system further includes a box body formed with an exhaust gas inlet and an exhaust gas outlet, a catalyst support incorporated into the box body, and a catalyst substance supported on the catalyst support, wherein a part of the catalyst support of the exhaust gas purifying catalyst is a low resistance area formed so that a gas flow resistance is lower than in other areas and disposed in such a position that a flow velocity of the exhaust gas flowing to the catalyst support is high.

The gas flow resistance decreases in the low resistance area provided in the catalyst support of the exhaust gas purifying catalyst, and therefore the exhaust gas is easier to flow in this area, whereby a flow velocity of the exhaust gas can be increased. Hence, an exhaust gas flow quantity per predetermined time in the low resistance area increase, and a heat transfer quantity from the exhaust gas to the catalyst can be augmented in the low resistance area. Then, a heat spot is produced in this low resistance area and rises in its temperature faster than in other areas, whereby the heat spot turns out to be a latent flame and a temperature rising region spreads in the periphery. With this contrivance, a temperature rising time of the whole catalyst becomes faster than in a case where the exhaust gas uniformly flows in.

In this case, the low resistance area is formed in such a position of the catalyst support that a flow velocity of the exhaust gas flowing into the catalyst support is high. Therefore, the temperature rising action occurs earlier in the low resistance area where the exhaust gas flows into the catalyst at a high velocity, so that the temperature rising speed of the whole catalyst becomes fast.

Further, an exhaust gas deflective flow passageway for deflecting a flow of the exhaust gas flowing to the catalyst may be formed in the exhaust passageway, and the low resistance area can be disposed to face to a highest speed flow of the exhaust gas flowing in from this exhaust gas deflective flow passageway.

The low resistance area is capable of reducing the gas flow resistance by forming a notched portion in the catalyst support. A distance, from an inflow side of the exhaust gas to an outflow side, of a part of the catalyst support is shortened by forming the above notched portion, whereby the gas flow resistance in that area is decreased.

The notched portion may be formed in an upstream-sided end surface of the catalyst support. It is proper that a depth of the notched portion is approximately $1/10$~$2/10$ of the total length of the catalyst, but is not limited in particular.

Further, the notched portion preferably takes such a configuration that a sectional diameter becomes gradually small toward the downstream side in the flow direction of the exhaust as. With this arrangement, a recessed portion taking a conical shape is formed, whereby the exhaust gas converges at the tip of this cone and a temperature at this portion is raised more quickly than in other portions.

An area positioned more downstream in the flow direction of the exhaust gas than the notched portion of the catalyst support, i.e., the low resistance area may support a greater quantity of catalyst substance than in other areas.

Thus, the high density support area for supporting the greater quantity of catalyst substance than in other areas, is formed, whereby burning of HC contained in the exhaust gas is accelerated in that area and the temperature increases much faster. Therefore, a function as the latent flame becomes more effective.

The notched portion may be formed in the downstream-sided end surface of the catalyst support.

An area positioned more upstream in the flow direction of the exhaust gas than the notched portion of the catalyst support may support a greater quantity of catalyst substance than in other areas.

With respect to the exhaust gas purifying catalyst, alumina may be exemplified as the catalyst support.

Further, the catalyst substance supported on such a catalyst support may be exemplified by alkali metals such as potassium K, sodium Na, lithium Li and cesium Cs, alkali earth such as barium Ba, calcium Ca, and rare earth such as lanthanum La and yttrium Y, and a precious metal such as platinum Pt, palladium Pd, rhodium Rh, and iridium Ir.

Note that a plurality of notched portions may also be provided. For instance, the plurality of notched portions is provided in dispersion in the exhaust gas inflow surface of the catalyst. In this case, it is preferable that an aperture size for one notched portion be set smaller than in the case of providing one single notched portion. With this contrivance, there is a plurality of portions where the temperature rapidly rises, whereby the so-called latent flames occur at multi points and heating spreads fast on the whole.

Moreover, the same effect is obtained even when an annular-notched portion is formed in the end surface of the catalyst.

Further, an exhaust gas guide passageway inclined toward the notched portion may be inclusively formed in the periphery of the notched portion of the catalyst support. In this configuration, the flow of the exhaust gas converges at the center of the notched portion, thereby accelerating the flow velocity of the exhaust gas. In this case, for example, the notched portion may be formed in a conical shape.

It is preferable that the exhaust gas purifying catalyst according to the present invention be disposed in the position that is as close to the exhaust port of the internal combustion engine as possible. For instance, the exhaust gas purifying catalyst is disposed posterior to an exhaust manifold, and the present invention is, it is preferable, applied as a structure of the start catalyst existing in that position.

Note that when the notched portion described above is provided, a loss of pressure of the exhaust gas passing through the catalyst decreases, and it can be expected that an exhaust gas purifying performance be enhanced due to the reduction in the entire pressure loss of the catalyst itself.

DESCRIPTION OF THE PREFERRED EMBODIMENT

An embodiment of an exhaust emission control system of an internal combustion engine according to the present invention will hereinafter be described with reference to the accompanying drawings.

<Outline of System>

Figure 1:
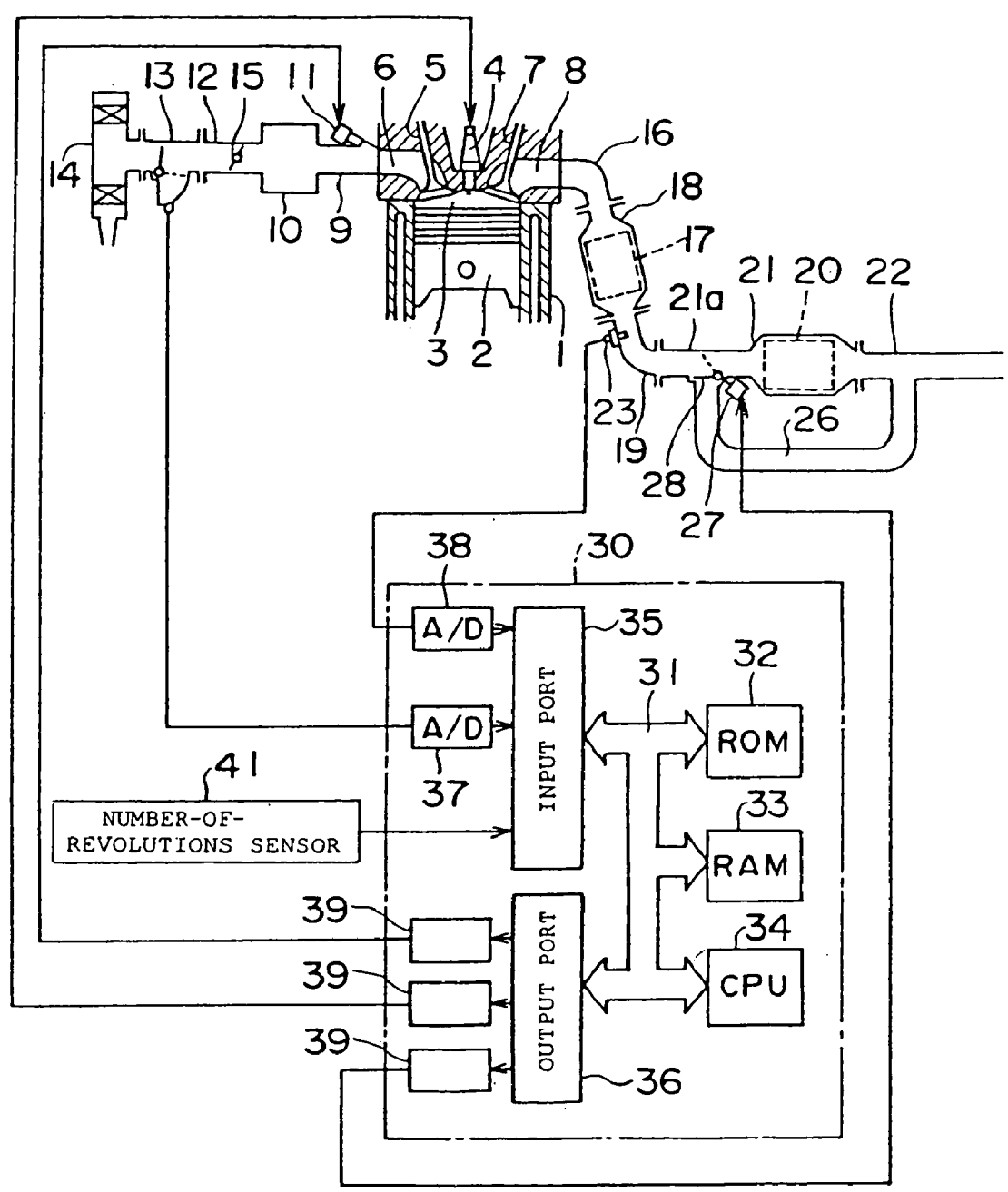
FIG. 1 is a diagram schematically showing a configuration of an exhaust emission control system of an internal combustion engine according to the present invention.

FIG. 1 is a diagram showing an outline of construction in a case where the present invention is applied to a gasoline engine for a vehicle that is capable of a lean burn. Referring to FIG. 1, there are shown an engine body 1, a piston 2, a combustion chamber 3, an ignition plug 4, an intake valve 5, an intake port 6, an exhaust valve 7 and an exhaust port 8.

The intake port 6 is connected via a corresponding branch pipe 9 to a surge tank 10, and each of the branch pipes 9 is fitted with a fuel injection valve 11 for injecting a fuel toward within each of the intake ports 6. The surge tank 10 is connected via an intake duct 12 and an airflow meter 13 to an air cleaner 14, and a throttle valve 15 is disposed inside the intake duct 12.

On the other hand, the exhaust port 8 is connected to a casing 18 encasing a three-way catalyst converter 17 that is a so-called start catalyst through an exhaust manifold 16. An outlet of the casing 18 is connected to a casing 21 encasing an occlusion reducing type NOx catalyst 20 through an exhaust pipe 19. This casing 21 is connected to an unillustrated silencer via an exhaust pipe 22.

An inlet 21a of the casing 21 and an exhaust pipe 22 are connected via a bypass pipe (bypass passageway) 26 that bypasses the NOx catalyst 20. An exhaust switch valve (corresponding to an exhaust route switch member) 28 of which the valve is operated by an actuator 27, is provided at the inlet 21a of the casing 21, at which the bypasses pipe 26 diverges. This exhaust switch valve 28 is operated to select any one of a bypass closing position in which to close, as shown by a solid line in FIG. 1, an inlet of the bypass pipe 26 and to fully open the inlet leading to the NOx catalyst 20, and a bypass opening position in which to close, as shown by a broken line in FIG. 1, the inlet leading to the NOx catalyst 20 and to fully open the inlet of the bypass pipe 26.

A digital computer based electronic control unit (ECU) 30 for controlling the engine includes a ROM (Read Only Memory) 32, a RAM (Random Access Memory) 33, a CPU (Central Processing Unit) 34, an input port 35 and an output port, which are connected to each other via a bidirectional bus 31. The airflow meter 13 generates an output voltage proportional to a quantity of suction air, and this output voltage is inputted to the input port 35 via an AD converter 37.

On the other hand, the exhaust pipe 19 disposed downstream of the three-way catalyst converter 17 is fitted with a temperature sensor 23 for generating an output voltage proportional to a temperature of an exhaust gas passing through the three-way catalyst converter 17. An output voltage of this temperature sensor 23 is input to the input port via the AD converter 38.

Further, a number-of-revolutions sensor 41 for generating an output pulse that represents the number of revolutions of the engine, is connected to the input port 35. The output port 36 is connected via a corresponding to a drive circuit 39 respectively to the ignition plug 4, the fuel injection valve 11 and the actuator 27.

Figure 2:
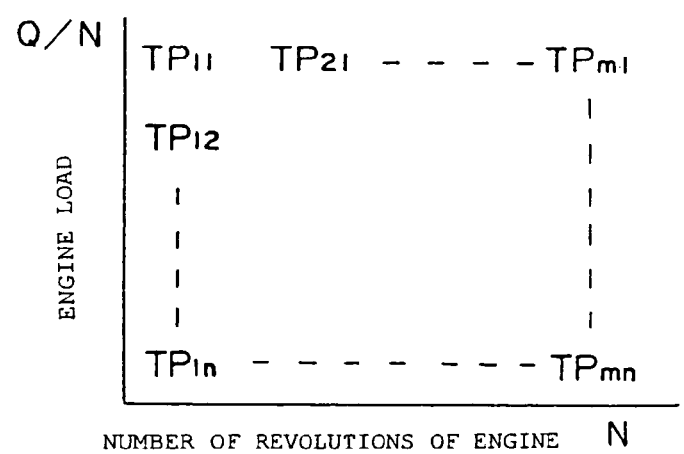
FIG. 2 is a diagram showing one example of a map of a basic fuel injection time.

In the thus constructed gasoline engine, for example, a fuel injection time TAU is calculated based on the following equation:

$$TAU=TP\cdot K$$

where TP is a basic fuel injection time, and K is a correction coefficient. The basic fuel injection time TP represents a fuel injection time needed for setting, to a theoretical air-fuel ratio, an air-fuel ratio of a mixed gas supplied to within engine cylinders. This basic fuel injection time TP is empirically obtained beforehand, and previously stored in the ROM 32 as a function of an engine load Q/N (suction air quantity Q/number-of-revolutions N of engine) and the number-of-revolutions N of the engine in the form of map as shown in FIG. 2. The correction coefficient K is a coefficient for controlling the air-fuel ratio of the mixed gas supplied to within the engine cylinders. When K=1.0, the mixed gas supplied to within the engine cylinders comes to have the theoretical air-fuel ratio. By contrast when K<1.0, the air-fuel ratio of the mixed gas supplied to within the engine cylinders becomes larger than the theoretical air-fuel ratio, i.e., it becomes lean. If K>1.0, the air-fuel ratio of the mixed gas supplied to within the engine cylinders becomes smaller than the theoretical air-fuel ratio, i.e., it becomes rich.

Then, in the gasoline engine in this embodiment, a value of the correction coefficient K is set smaller than 1.0 in an engine low/intermediate load operation region, and the lean air-fuel ratio control is carried out. Then, the value of the correction coefficient K is set equal to 1.0 in an engine high load operation region when in a warm-up operation at the start of the engine, an acceleration and a constant speed operation over 120 km/h, and stoichiometric ratio control is conducted. In an engine full load operation region, the value of the correction coefficient K is set larger than 1.0, and rich air-fuel ratio control is performed.

Figure 3:
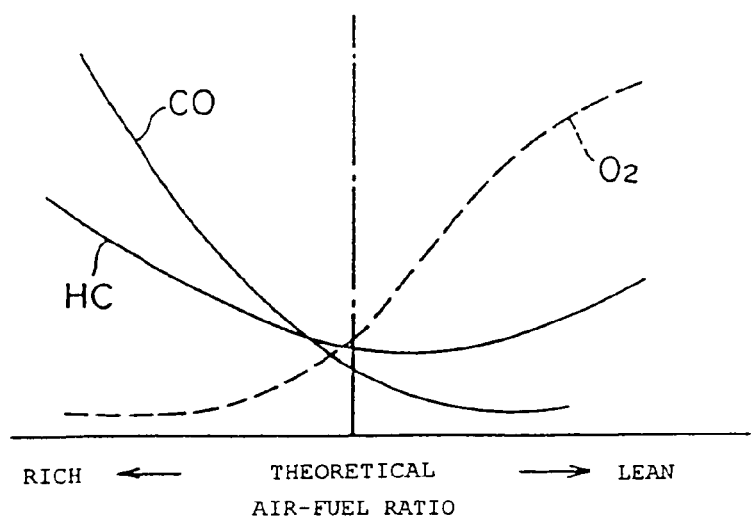
FIG. 3 is a diagram schematically showing concentrations of oxygen, unburned HC, CO contained in an exhaust gas discharged from the internal combustion engine.

A frequency of being operated with a low/intermediate load is the highest in the internal combustion engine, and therefore the value of the correction coefficient K is set smaller than 1.0 for a large proportion of the operation period, and it follows that the lean mixed gas is burned, FIG. 3 schematically shows concentrations of physical components in the exhaust gas discharged from the combustion chamber 3. As can be understood from FIG. 3, the concentrations of unburned HC, CO in the exhaust gas discharged from the combustion chamber 3 become higher as the air-fuel ratio of the mixed gas supplied to within the combustion chamber 3 becomes richer, and the concentration of oxygen $O_2$ in the exhaust gas discharged from the combustion chamber 3 become higher as the air-fuel ratio of the mixed gas supplied to within the combustion chamber 3 becomes leaner.

<Structure and Function of Catalyst>

A structure of the three-way catalyst converter 17 is that a honeycomb- or lattice-like cell 51 composed of corgurite-series and ferrite-series stainless steel is of a monolith type in which the cell 51 is coated with alumina, and a catalyst substance having catalyst action on alumina is adhered to the cell 51. Alumina supports a precious metal such as platinum (Pt)+rhodium (Rh), and platinum (Pt)+rhodium (Rh)+palladium (Pd) as a catalyst substance. The three-way catalyst converter 17 simultaneously reduces the three components CO, HC and NOx in the exhaust gas by the following reaction:

$$(O_2, NOx)+(CO, HC, H_2)\rightarrow H_2+H_2O+CO_2.$$

Figure 4:
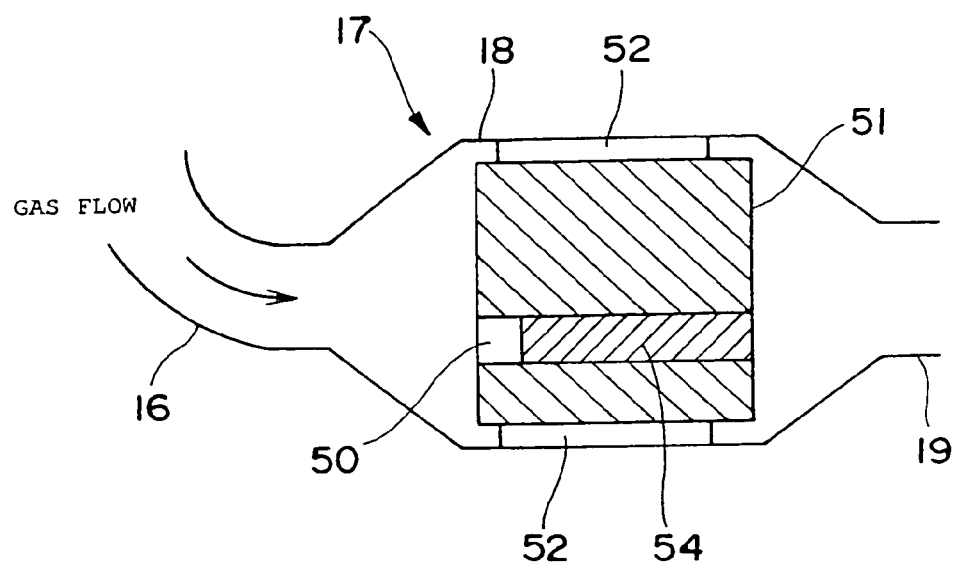
FIG. 4 is a diagram showing one example of a catalyst support provided with a notched portion.

As shown in FIG. 4, the three-way catalyst converter 17 is constructed by providing the monolith-type cell 51 into the casing 18 provided midways of the exhaust pipe, with a shock absorbing material 52 being interposed therebetween.

The cell 51 has a notched portion 50 formed in an exhaust gas inflow surface thereof. The notched portion 50 exists in a position decentered from the center the cell 51. The exhaust pipe 19 or the exhaust manifold 16 is, however, bent on the upstream side of the exhaust gas flow with respect to the cell 51, and hence the exhaust inflow surface formed with the notched portion 50 faces to the exhaust gas flow having a maximum flow velocity.

Figure 6:
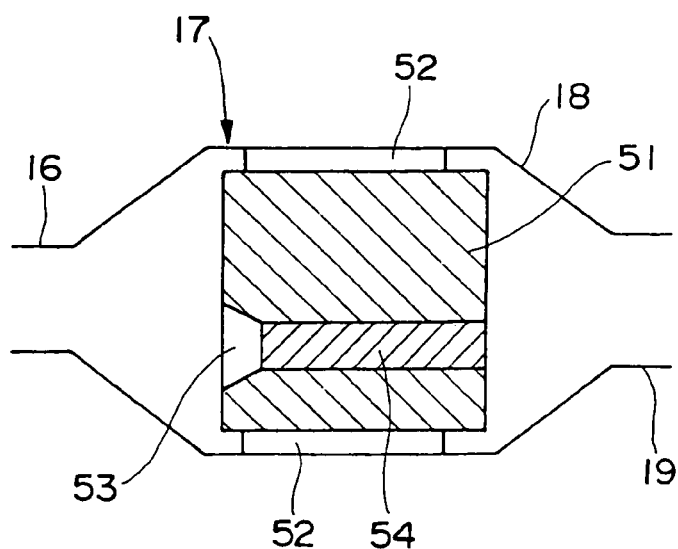
FIG. 6 is a diagram showing still another example of the catalyst support provided with the notched portion.

If the exhaust pipe 16 is thus bent upstream of the three-way catalyst converter 17, the exhaust pipe 16 becomes an exhaust gas deflective flow passageway for causing a deflective flow of the exhaust gas flowing into the catalyst. In this case, as shown in FIGS. 4 and 6, the positions of the notched portions 50, 53 serving as the high-speed inflow portions are set deflective so as to face the deflective flow of the exhaust gas from the exhaust gas deflective flow passageway. With this contrivance, the deflected flow of the exhaust gas can be received from the front surface thereof, and there can be produced a spotwise inflow of the exhaust gas from the notched portion 53.

Figure 5:
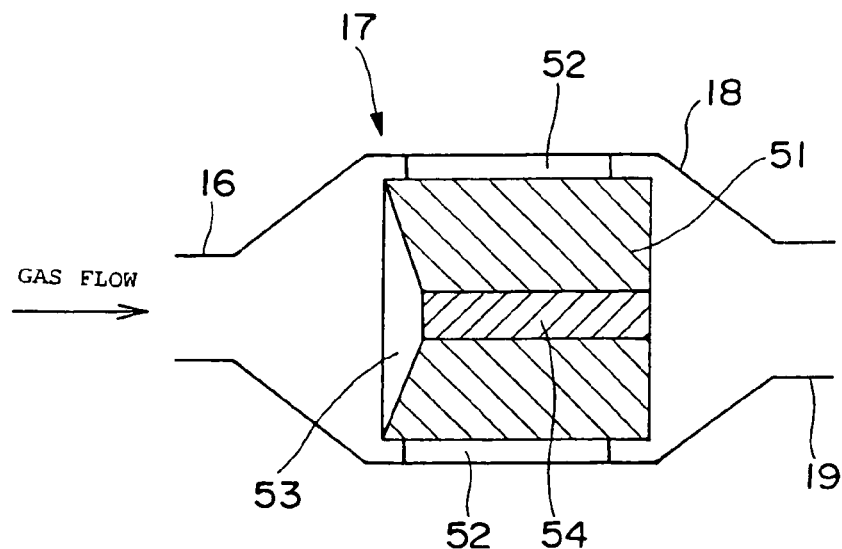
FIG. 5 is a diagram showing another example of the catalyst provided with a notched portion.

The notched portion 50 takes a recessed configuration of which a diameter is uniform in the example shown in FIG. 4. As shown in FIGS. 5 and 6, however, the notched portion 50 may take configuration that a sectional diameter is gradually decreased towards the downstream side of the exhaust gas (which will hereinafter be called a conical shape). The notched portion 53 shown in FIG. 5 exhibits a sharp change in diameter thereof. The notched portion 53 shown in FIG. 6 exhibits a moderate change in diameter thereof. Further, in the example shown in FIG. 5, the exhaust gas flows substantially straight just before the cell 51, and therefore the center of the notched portion 53 that should face to the exhaust gas flow having the maximum flow velocity is substantially concentric with the center of the cell

51. A depth of each of the notched portions 50, 53 is herein set within a range of 1/10~2/10 of the total length of the catalyst cell 51.

When these notched portions 50, 53 are provided in the inflow side end surface of the cell 51, low resistance areas 54 of which exhaust gas passage distances are shorter by the depths of the notched portions 50, 53 than other areas, are produced downstream in the flow direction of the exhaust gas. Namely, with the formations of the notched portions 50, 53, there decreases the resistance of a part of the passageway of the cell 51, which corresponds to the portion formed with each of the notched portion 50, 53, this resistance-decreased area becomes the low resistance area 54. The flow velocity of the exhaust gas increases in this low resistance area 54, and hence a quantity of the exhaust gas passing through the low resistance area 54 per predetermined time increases, When the quantity of the exhaust gas increases, a heat transfer quantity to the cell 51 from the exhaust gas rises corresponding to this increase, with the result that a heat spot is formed in the low resistance area 54. A temperature rising region expands from this heat spot, and it is therefore feasible to raise the temperature of the cell 51 faster than in the case of the uniform inflow of the exhaust gas.

Further, the low resistance area 54 may be defined as a high-density support area 54 in which a larger quantity of the catalyst substance is supported than in other areas of the cell 51.

<Flow Velocity Improvement Test>

Next, a test for confirming an improvement of the flow velocity due to the formation of the notched portion 50 was carried out.

The three-way catalyst converter used herein has such a configuration that the cell 51 takes a circular shape in section, and a diameter thereof is 140 mm. The notched portion 50 is formed substantially at the center of the cell 51. The notched portion 50 is 20 mm in diameter and 30 mm in depth. This notched portion 50 is provided inside the exhaust passageway of the internal combustion engine. A flow velocity of the exhaust gas at a rear end surface from which the exhaust gas passing through within the three-way catalyst converter flows out, is measured along the periphery from the center thereof.

Further, as a comparison in contrast, the cell 51 formed with no notched portion 50 is provided inside the exhaust passageway, and the flow velocity of the exhaust gas is measured in the same way as the above.

Figure 7:
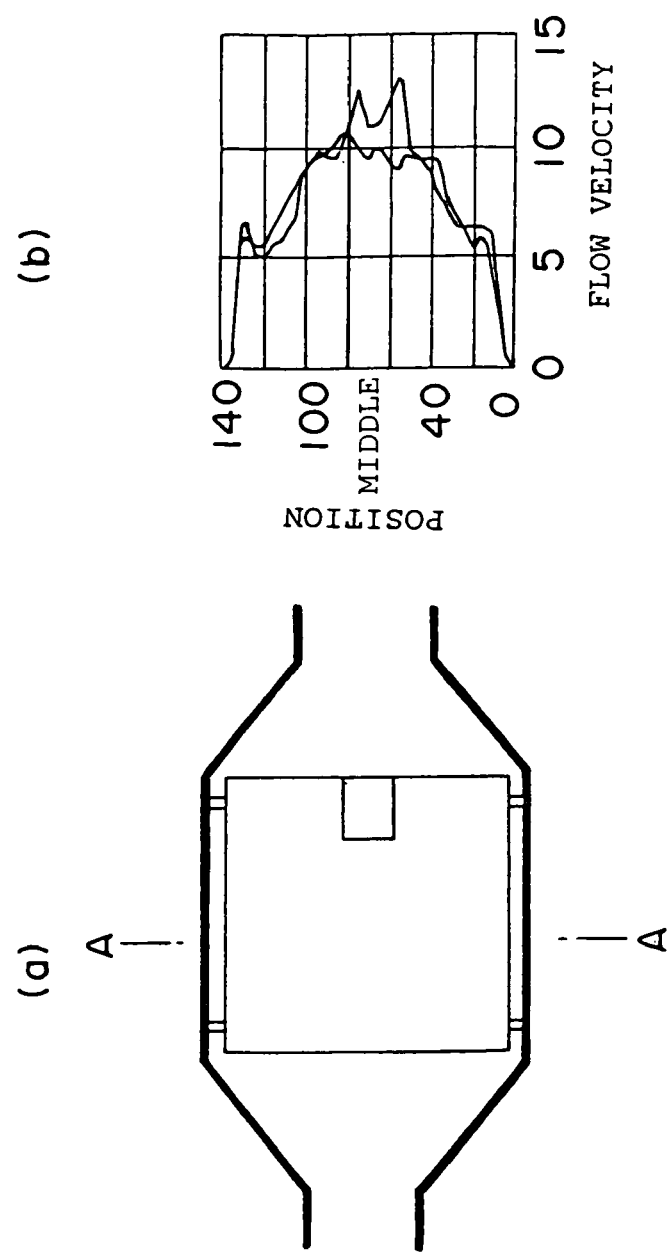
FIG. 7 is a diagram showing a result of a test for improving a flow velocity when provided with the notched portion.

FIG. 7(*b*) shows a result of this measurement. Herein, FIG. 7(*b*) shows a flow velocity distribution in the section, taken along the line A—A, of the cell 51 in FIG. 7(*a*), and it can be understood that the flow velocity is improved in the vicinity of the center of the cell 51 formed with the notched portion 50.

In the case of the cell formed with no notched portion 50 which has been given as the comparison in contrast, the flow velocity in the vicinity of the center is 10 m/s or thereabouts. In the case of its being formed with the notched portion 50, however, the flow velocity is improved up to 12~13 m/s in the vicinity of this notched portion 50. It can be therefore understood that the provision of the notched portion improves the flow velocity of the exhaust gas passing through inside the cell 51 in the region formed with the notched portion 50.

<Warm-up Improvement Test>

Next, a test for confirming an improvement of a warm-up characteristic due to the formation of the notched portion 50 was carried out.

Herein, the same catalyst as in the flow velocity improvement test is used.

This catalyst is provided within the exhaust passageway of the internal combustion engine, and the internal combustion engine is operated, thus measuring a quantity of HC contained in the exhaust gas in front and rear of the three-way catalyst converter.

Further, as a comparison in contrast, the cell 51, without the notched portion 50, is provided in the exhaust passageway, and the HC quantity in the exhaust gas is measured in the same way as the above-described method.

Figure 8:
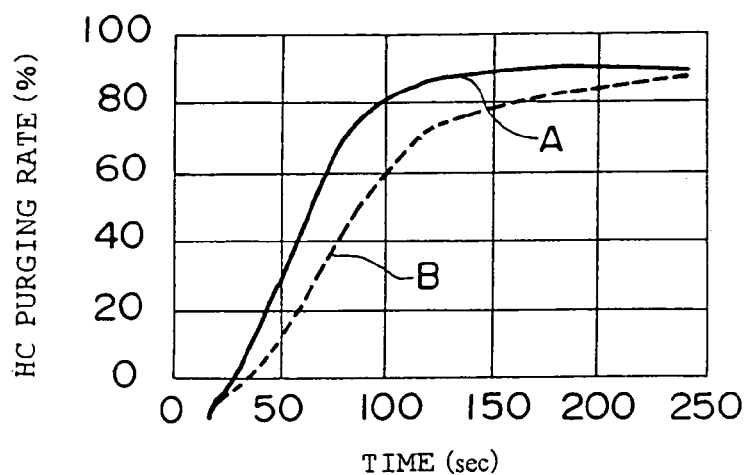
FIG. 8 is a diagram showing a result of a test for improving an HC purifying rate and a warm-up characteristic when provided with the notched portion.

FIG. 8 shows a result of this measurement. Herein, an HC purifying rate in the case of providing the notched portion 50 reaches 90 % in approximately 120 sec since the start-up of the internal combustion engine. By contrast, in the case of the cell formed with no notched portion 50, the HC purifying rate is low on the whole and does not reach 90 % till there is an elapse of 200 sec or longer.

Accordingly, when provided with the notched portion, the temperature rising speed is faster than in the case of providing no notched portion 50. As a result, it can be understood that the temperature of the catalyst reaches a purifying region at an early stage since the start-up of the internal combustion engine, and the HC purifying rate is enhanced.

<NOx Catalyst Converter>

Next, the NOx catalyst converter 20 disposed downstream of the three-way catalyst converter 17 is constructed such that, for example, alumina serves as the support at least one substance selected among alkali metals such as potassium K, sodium Na, lithium Li and cesium C, alkali earth such as barium Ba, calcium Ca, and rare earth such as lanthanum La and yttrium Y, and a precious metal such as platinum Pt are supported on that support.

This NOx catalyst converter 20, If disposed in the exhaust passageway, performs a NOx absorbing/releasing operation of absorbing NOx when an air-fuel ratio of the inflow exhaust gas (which will hereinafter be termed an exhaust air-fuel ratio) is lean, and releasing NOx when an oxygen concentration in the inflow exhaust gas decreases. Herein, the exhaust air-fuel ratio indicates a ratio of the air to the fuel (hydrocarbon) that is supplied to within the exhaust passageway disposed more upstream than the engine intake passageway and the NOx catalyst converter 20.

Note that if the fuel (hydrocarbon) or the air is not supplied to within the exhaust passageway disposed more upstream than the NOx catalyst converter 20, the exhaust air-fuel ratio is coincident with the air-fuel ratio of the mixed gas supplied into the combustion chamber 3. Accordingly, in this case, the NOx catalyst converter 20 absorbs NOx when the air-fuel ratio of the mixed gas supplied into the combustion chamber is lean, and releases NOx when the oxygen concentration in the mixed gas supplied into the combustion chamber 30 decreases.

Further, the fuel contains sulfur (S), and, when sulfur in the fuel is burned, sulfur oxide (SOx) such as $SO_2$ and $SO_3$ is produced. The three-way catalyst converter 17 captures SOx contained in the exhaust gas. In this embodiment, a quantity of SOx absorbed by the three-way catalyst converter 17 is estimated based on a hysteresis of the engine operation state. Timing when this estimated SOx absorption quantity comes to a predetermined quantity is judged to be timing when SOx should be released from the SOx absorbent 17. Then, there is executed a process of positively releasing SOx out of the three-way catalyst converter 17 (which will hereinafter be called a reproducing process). When executing the reproducing process of the three-way catalyst converter 17, the ECU 30 controls a temperature of the exhaust gas by use of a proper contrivance, and controls the temperature of the three-way catalyst converter 17 to a predetermined temperature (e.g., 550° C.) or higher.

When the three-way catalyst converter 17 reproduces the exhaust gas, it follows that a larger quantity of SOx released is contained in the exhaust gas flowing out of the three-way catalyst converter 17. Hence, when this reproduced exhaust gas flows into the NOx catalyst converter 20, the NOx catalyst converter 20, with the result that the NOx catalyst converter 20 undergoes SOx poisoning, absorbs SOx in the reproduced exhaust gas. Such being the case, the exhaust switch valve 28 is held in the bypass opening position when executing the reproducing process of the three-way catalyst converter 17 in order to prevent this poisoning, and the reproduced exhaust gas flowing out of the three-way catalyst converter 17 is led into the bypass pipe 26. Note that SOx released from the three-way catalyst converter 17 is reduced into $SO_2$ by unburned HC and CO contained in the exhaust gas and thus discharged.

Note that when in a non-reproducing process of the three-way catalyst converter 17, the exhaust switch valve 28 is held in the bypass closing position, and the exhaust gas flowing out of the three-catalyst converter 17 is led to the NOx catalyst converter 20 so as not to flow to the bypass pipe 26.

<Function of Catalyst at Start of Internal Combustion Engine>

The NOx catalyst, when not reaching the predetermined temperature region, does not exhibit sufficiently an emission purifying function. This is the same with the three-way catalyst converter 17. The three-way catalyst converter 17 is, however, disposed in a position closer to the internal combustion engine, and therefore a temperature thereof is raised fast. Hence, the three-way catalyst converter 17 quickly rises in temperature at the start-up of the internal combustion engine, and, even before the NOx catalyst 20 does not yet sufficiently function, the exhaust gas can be purified. This is the reason why the three-way catalyst converter 17 is referred to as the start catalyst.

Figure 9:
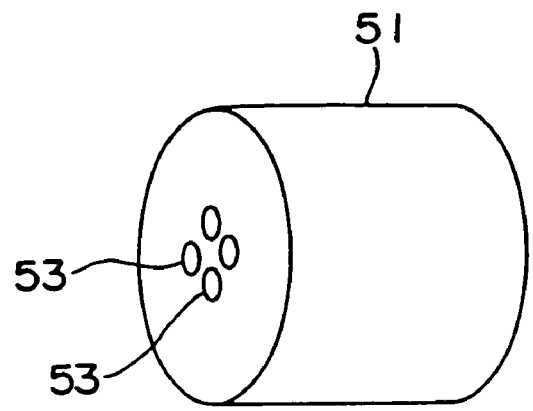
FIG. 9 is a diagram showing an example where a plurality of notched portions are provided.

In the three-way catalyst converter 17 in this embodiment, the exhaust gas inflow surface to the cell 51 is formed with the notched portion 53 serving as the exhaust gas high-speed inflow area, and hence the flow velocity of the exhaust gas flowing into the catalyst 17 becomes fast in the area of the notched portion 53, with the result that a catalyst temperature in this area rises faster than in other areas peripheral thereto. In the case of a large-size catalyst converter, it is possible to provide a plurality of notched portions in a center portion thereof. For example, this temperature rising time becomes, as shown in FIG. 9, much faster if a plurality of notched portions 53 are provided.

Figure 10:
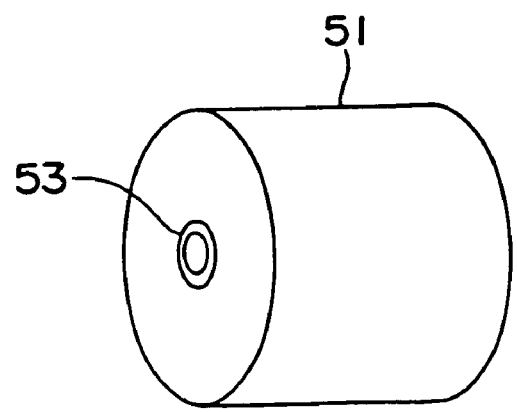
FIG. 10 is a diagram showing an example where the notched portion is formed in an annular shape.

Further, as shown in FIG. 10, even when an annular notched portion is formed in the end surface of the catalyst, the temperature rising time similarly becomes fast.

Besides, corresponding to the notched portion 53, the high density support area 54 supports a larger quantity of catalyst substance than in other areas of the cell 51, and therefore the temperature rising action becomes more effective.

A latent flame occurs in the area corresponding to the notched portion 53, and the temperature rising region spreads in the periphery, whereby the temperature rises more quickly than in the case where the exhaust gas uniformly flows in.

Thus, when the notched portion 53 is formed in the end surface of the catalyst, the catalyst temperature rising speed is faster than in the case of providing no notched portion 53.

Further, when the high-density support area 54 is provided, the temperature rising speed becomes faster.

Accordingly, the catalyst can be warmed up more quickly when starting up the internal combustion engine, and the exhaust gas can be effectively purified. Especially, the warm-up of the catalyst can be speeded up, and hence the performance as the start catalyst can be enhanced.

Moreover, the temperature of the catalyst can be raised quickly, so that this is advantageous for executing the reproducing process of the three-way catalyst converter 17.

The present invention is applied to the three-way catalyst converter 17 as the start catalyst in the embodiment discussed above, however, the notched portion 53 and the high density support area 54 may also be provided in the NOx catalyst 20 shown in FIG. 1. When the NOx catalyst 20 is provided with the notched portion 53 and the high density support area 54, as in the case of providing the three-way catalyst converter 17, the time required for the NOx catalyst 20 reaches the active temperature region is shortened, and the exhaust gas is purified more effectively at the start-up of the internal combustion engine.

According to the present invention, the flow velocity of the exhaust gas flowing through the catalyst support low resistance area, can be made faster than in other areas, and therefore the flow quantity of the exhaust gas per unit time increases, with the result that the temperature in the low resistance area rises faster than in the peripheral areas. Then, the latent flame occurs in this area, and the temperature rising region spreads in the periphery, whereby temperature of the catalyst can be raised more quickly than in the case where the exhaust gas uniformly flows in and the effect given above can be further enhanced.

What is claimed is:

1. An exhaust emission control system of an internal combustion engine, comprising:
    (A) an internal combustion engine; and
    (B) an exhaust gas purifying catalyst provided in an exhaust passageway of said internal combustion engine,
    said exhaust gas purifying catalyst including:
        (a) a box body formed with an exhaust gas inlet and an exhaust gas outlet;
        (b) a catalyst support incorporated into said box body;
        (c) a catalyst substance supported on said catalyst support, said catalyst substance forming a region through which exhaust gasses pass, wherein:
            the catalyst substance includes a notched portion that is recessed from an exhaust inflow surface of the catalyst substance; and
        (d) a high-density portion disposed within the catalyst substance and downstream in an exhaust gas flow direction from the notched portion.

2. An exhaust emission control system of an internal combustion engine according to claim 1, wherein a plurality of notched portions are formed.

3. An exhaust emission control system of an internal combustion engine according to claim 1, wherein said notched portion takes an annular shape.

4. An exhaust emission control system of an internal combustion engine according to claim 1, wherein said notched portion includes an exhaust gas guide passageway inclined.

5. An exhaust emission control system of an internal combustion engine according to claim 4, wherein said notched portion takes a conical shape.

6. An exhaust emission control system of an internal combustion engine, comprising:

(A) an internal combustion engine; and
(B) an exhaust gas purifying catalyst provided in an exhaust passageway of said internal combustion engine,
said exhaust gas purifying catalyst including:
(a) a box body formed with an exhaust gas inlet and an exhaust gas outlet;
(b) a catalyst support incorporated into said box body;
(c) a catalyst substance supported on said catalyst support, said catalyst substance forming a region through which exhaust gasses pass, wherein:

the catalyst substance includes a notched portion that is recessed from an exhaust inflow surface of the catalyst substance; and
(d) a high-density portion disposed within the catalyst substance and downstream in an exhaust gas flow direction from the notched portion, wherein the notched portion and high density portion form a flat interface.

* * * * *